(12) United States Patent
Monti (10) Patent No.: US 8,434,611 B2
(45) Date of Patent: May 7, 2013

(54) SYSTEM FOR SUPPLYING ARTICLES TO A PLATFORM ROTATING ABOUT A VERTICAL AXIS

(75) Inventor: Giuseppe Monti, Pianoro (IT)

(73) Assignee: NERI S.p.A., Barberino di Mugello (Firenze) (IT)

( * ) Notice: Subject to any disclaimer, the term of this patent is extended or adjusted under 35 U.S.C. 154(b) by 177 days.

(21) Appl. No.: 13/049,081

(22) Filed: Mar. 16, 2011

(65) Prior Publication Data

US 2011/0229295 A1     Sep. 22, 2011

(30) Foreign Application Priority Data

Mar. 17, 2010 (IT) .............................. BO2010A0167

(51) Int. Cl.
*B65G 47/34* (2006.01)

(52) U.S. Cl.
USPC .................. 198/479.1; 198/480.1; 198/481.1

(58) Field of Classification Search ............... 198/469.1, 198/470.1, 478.1, 479.1, 480.1, 481.1
See application file for complete search history.

(56) References Cited

U.S. PATENT DOCUMENTS

| | | | | |
|---|---|---|---|---|
| 2,570,198 | A | 10/1951 | Leif | |
| 4,938,337 | A * | 7/1990 | Jowitt et al. | 198/470.1 |
| 6,644,462 | B2 * | 11/2003 | Hiramoto et al. | 198/478.1 |
| 7,823,717 | B2 * | 11/2010 | Zanini et al. | 198/479.1 |
| 7,837,026 | B2 * | 11/2010 | Zanini et al. | 198/478.1 |

FOREIGN PATENT DOCUMENTS

| | | |
|---|---|---|
| DE | 3426713 A | 1/1986 |
| DE | 19922873 A | 11/2000 |
| EP | 0326705 A | 8/1989 |
| EP | 1213241 A | 6/2002 |
| WO | WO97/38930 A | 10/1997 |

OTHER PUBLICATIONS

International Search Report for corresponding EP patent application No. EP 11 15 8337, Completed Apr. 14, 2011, 2 pages.

* cited by examiner

*Primary Examiner* — James R Bidwell
(74) *Attorney, Agent, or Firm* — William J. Sapone; Ware Fressola; Maguire & Barber LLP (57) ABSTRACT

A system for supplying articles to a platform rotating about a vertical axis, the platform exhibiting seatings (K) conformed for receiving corresponding articles (10), vertical axes (B) of which are situated on a circumference (C1) which is coaxial to an axis of the platform (60), the vertical axes (B) being angularly equidistanced such as to define a predetermined operating step (Po). The system comprises: a straight-developing line (50), supplied with articles (10), for intermittently transferring the articles (10) at an intermediate step (Ps) which is lower than the operating step (Po) to a terminal station (Q); at least an article pick-up-and-transfer member (19), interposed between the line (50) and the platform (60), borne by a device (1) activated in phase relation with the movement of the line (50) and platform (60), destined, with an operating head (21) thereof, to engage the article situated at the terminal station (Q) in an inclined direction with respect to the straight development (S) of the line (50), and subsequently to transfer the article to a corresponding seating (K) of the platform (60) in order to define, for the vertical axis (Z) of the article, a trajectory which develops in an arc of circumference (C2) tangential to the circumference (C1) on which the axes (B) of the seatings (K) are arranged and with a peripheral velocity which is equal to a velocity (Vp) of the axes (B).

14 Claims, 6 Drawing Sheets

SYSTEM FOR SUPPLYING ARTICLES TO A PLATFORM ROTATING ABOUT A VERTICAL AXIS

DESCRIPTION OF THE PRIOR ART

The prior art comprises apparatus constituted by a circular platform, known as a carousel by technicians in the sector, which rotates with respect to a vertical axis, on a periphery of which seatings are realized, suitable for receiving articles; operating stations are peripherally associated to the carousel, which are for actuating predetermined operations on the articles, for example applying one or more labels on each article.

The articles are supplied to the carousel by means of a vertical-axis star conveyor, in turn supplied by a supply line, for example an Archimedes screw.

The star conveyor peripherally exhibits angularly equidistanced recesses, the profile of which is circular in a plane that is perpendicular to the axis thereof.

The transfer of the articles from the screw requires equality between the translational velocity imposed on the articles by the screw and the peripheral velocity of the axes (centers) of the recesses; and consequently also equality of the steps between consecutive articles in the screw and two articles inserted in two consecutive recesses.

The transfer of the articles from the star conveyor to the carousel also involves an equality between the peripheral velocity of the centers of the recesses and the peripheral velocity of the vertical axes of the carousel seatings; this involves equality of the steps between two consecutive articles drawn by the star conveyor and two articles located in two consecutive seatings of the carousel.

It is known that the articles are supplied, upstream of the screw, side-by-side with one another; each article is engaged by the groove of the screw which distances it such as to define, with the preceding article, the predetermined step, with an equal velocity to the peripheral velocity of the centers of the recesses in the star conveyor.

It is known that the articles subjected to the action of the screw are supported at the base thereof and guided laterally by an abutment parallel to the screw axis.

With articles whose height is prevalent with respect to the other dimensions thereof (for example vials) or with products whose shape makes them unstable, the acceleration mentioned above tends to cause, by inertia, stresses in an opposite direction to the movement direction of the articles at the portion thereof projecting from the screw; this can cause them to tip over, or to shift, with all the problems that brings.

This negative aspect is accentuated with an increase in the overall productivity of the screw-star-carousel sequence, and with the increase in height of the article with respect to the height (diameter) of the screw.

SUMMARY OF THE INVENTION

The aim of the invention is that it provides a system for supplying articles to a platform that rotates with respect to a vertical axis, which eliminates the drawbacks in the prior art, and in particular which makes the drawing velocity of the articles in the supply line and the peripheral velocity of the axes of the seatings of the carousel independent of one another.

A further aim of the invention is that is provides a system which enables the supply line to function with a step between two consecutive articles which is less than the step between two consecutive seatings of the carousel.

A further aim of the invention is to provide a system which not only satisfies the previous aims but also is reliable, functional and easily associable upstream of the carousel.

The above aims are attained by a system for supplying articles to a platform rotating about a vertical axis, the platform exhibiting seatings conformed for receiving corresponding articles, vertical axes of which are situated on a circumference which is coaxial to an axis of the platform, the vertical axes being angularly equidistanced such as to define a predetermined operating step, characterized in that it comprises: a straight-developing line, supplied with articles, for intermittently transferring the articles at an intermediate step which is lower than the operating step (Po) to a terminal station; at least an article pick-up-and-transfer member, interposed between the line and the platform, borne by a device activated in phase relation with the movement of the line and platform, destined, with an operating head thereof, to engage the article situated at the terminal station in an inclined direction with respect to the straight development of the line, and subsequently to transfer the article to a corresponding seating of the platform in order to define, for the vertical axis of the article, a trajectory which develops in an arc of circumference tangential to the circumference on which the axes of the seatings are arranged and with a peripheral velocity which is equal to a velocity of the axes.

The inclined direction is the sum of two components, respectively parallel and perpendicular to the straight development of the line, with the perpendicular component being greater than the other component.

The above-mentioned inclined direction preferably identifies, with respect to the straight development of the line, an angle comprised between ±5 degrees with respect to the perpendicular to the straight development of the line.

The proposed solution makes the velocity with which the line (screw) translates the articles independent of the peripheral velocity of the axes of the platform seating; it follows that the step between the articles drawn by the screw is considerably smaller than the step between two seatings of the platform (carousel).

The screw is moved in such a way as not to overturn or shift the articles; the only requirement is that each article is positioned in the terminal station in phase relation with the intervention therein of the article pick-up and transfer organ.

The number of pick-up-and-transfer organs is such as to enable the productivity required by the carousel.

BRIEF DESCRIPTION OF THE DRAWINGS

Further characteristics and advantages of the proposed invention will emerge from the following description, which makes reference to the appended tables of drawings, in which.

DESCRIPTION OF THE PREFERRED EMBODIMENTS

With reference to the figures of the drawings, the proposed system is constituted by an Archimedes screw 50 and by a device 1 interposed between the screw 50 and rotating platform or carousel 60.

In a known way, the screw 50 draws the articles 10 along a straight trajectory S such as to distance them according to an intermediate step Ps and draw them, with a velocity Vs, up to a terminal station Q; as the support plane for the articles drawn by the screw and the small lateral guide wall (parallel to the axis of the screw) of the articles are common knowledge for the technician in the sector, they are not illustrated.

With reference to the article 10, Z denotes the axis thereof.

The vertical-axis G1 carousel 60 is drawn in a known way in constant rotation in direction F, and is provided with seatings K conformed, in accordance with methods known to the expert in the sector, such as to removably receive corresponding articles 10.

The vertical axes B of the seatings are situated on a circumference C1, coaxial to the axis of the rotation, and are angularly equidistanced such as to identify an operating step Po which is greater than the intermediate step Ps; the peripheral velocity Vp of the axes B is greater than the drawing velocity Vs imposed by the screw on the articles drawn thereby.

Operating stations (not illustrated) are associated to the carousel, destined to actuate predetermined operations on the articles, for example applying one or more labels thereto.

With reference to the figures of the drawings, the device 10 is constituted by a drum 11 having a vertical axis G2 and being rotatably supported (in a known way) by the structure 12 which also supports the carousel 60.

A cogged wheel 13 is keyed inferiorly to the drum, which cogged wheel 13 enmeshes with suitable organs (not illustrated) with the aim of drawing the drum in constant rotation in direction W.

At the relative heads 11A, the drum rotatably supports vertical spindles 14 (axes G3) (three in FIGS. 2a-2c, 4, 5 and five in FIGS. 3a-3c) equidistant from both the shaft G2 and angularly to one another.

Figure 6:
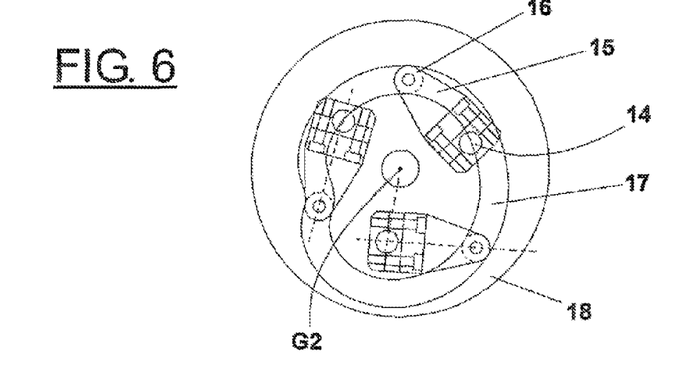
FIG. 6 is a plan view of detail H of FIG. 5, with some parts removed better to evidence others.

An arm 15 is inferiorly blocked to each spindle 14, perpendicular to the spindle 14 (see FIGS. 5, 6), a free end of which idly supports a roller 16 the axis of which is parallel to the spindle 14; the roller 16 runs in a ring-closed cam race 17 (the axis of which coincides with the axis G2 of the drum 11) afforded in the upper part of a fixed disc 18 constrained to the structure 12.

A pick-up-and-transfer organ 19 is keyed to the upper part of each spindle 14, which organ 19 is constituted by a wing 20, perpendicular to the spindle 14 and providing an operating head 21.

The profile of the head, in a perpendicular plane to the axis G3, is concave with a circular progression with respect to an axis Y parallel to the axis Y; the profile is complementary to the transversal section of the articles 10.

The functioning of the proposed system is evident from FIGS. 7a-7g, which in plan view schematically illustrate the screw 50, the device 1, with only a single organ 19 represented with a relative spindle 14, the cam race 17 in which the roller 16 borne by the arm 15 runs being constrained to the spindle 14.

The movement of the organ 19, borne by the spindle 14, is achieved by a combination of two movements:
  the constant rotation of the spindle (direction VV) about the axis G2;
  the oscillation of the spindle 14 with respect to the axis G3 imposed by the arm 15 as the roller 16 is forced to run in the cam race 17.

The above leads to the variation of the distance between the axis G2 of the cam race 17 and the axis Y of the circular profile of the head 21.

Figure 7A:
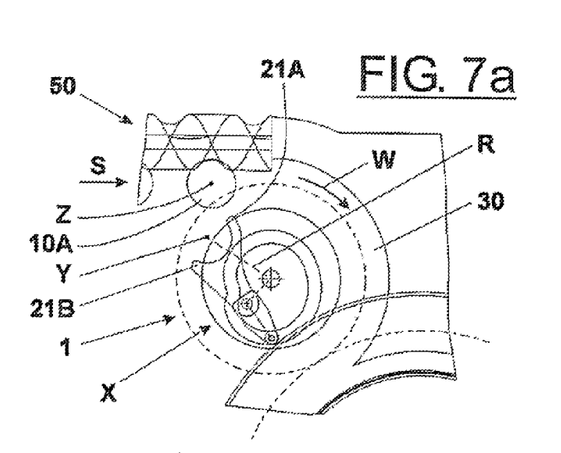
FIGS. 7a-7g illustrate 7 positions of the device when an article is picked up from the screw up to the transfer thereof onto a corresponding seating on the carousel.

In FIG. 7a the head article 10A in the screw 50, drawn by the screw 50 in direction S, is positioned upstream of the terminal station, or disengagement station Q, in which the screw releases the articles; in FIG. 7a the organ 19 is in a position X in which the ends 21A, 21B of the head 21 do not interfere with the article 10A: the distance between the axes G2 and Y is indicated by R.

Figure 7B:
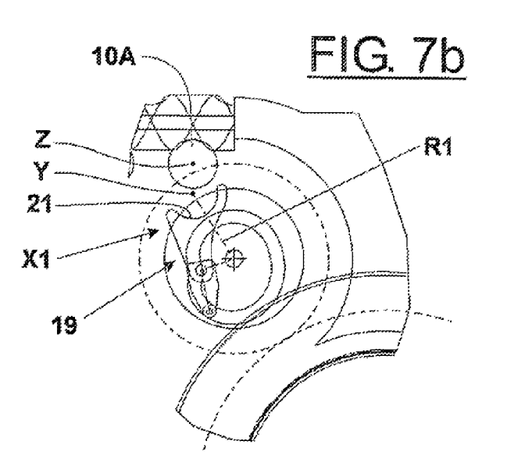

In FIG. 7b the articles 10A is still upstream of the disengagement station Q, the organ 19 (position X1) has neared the article 10A without interfering there-with: the distance between the axes G2 and Y is equal to R1 and is increased with respect to preceding value R.

Figure 7C:
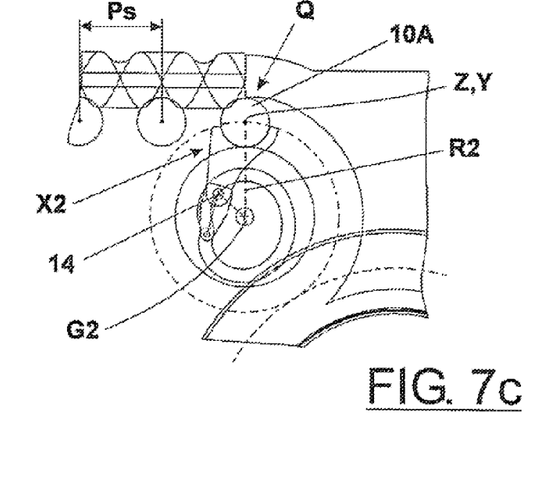
Figure 7D:
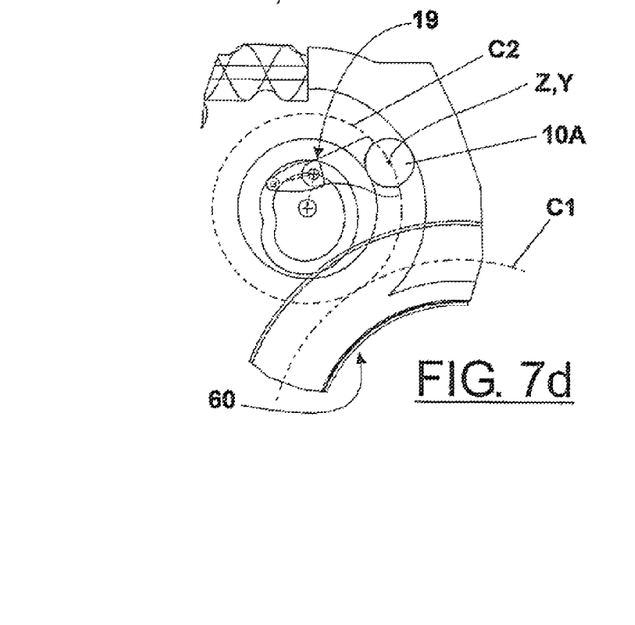
Figure 7E:
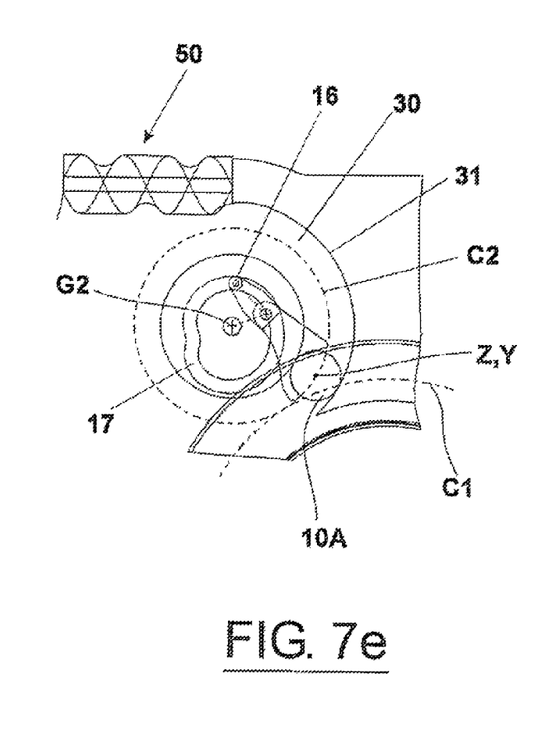
Figure 7F:
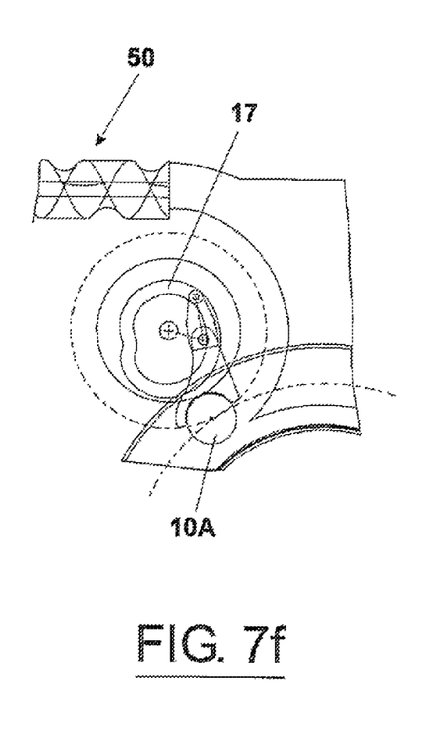

In FIG. 7c the article 10A is in the station Q in which the screw disengages from the article; the distance between the axes G2 and Y assumes the maximum value R2, increased with respect to preceding value R1, and the axis Y in a preferred but not exclusive embodiment coincides with the axis Z of the article 10A (position X2 of the organ 19): in this situation the axis Y of the recess of the head 21 coincides with the vertical axis Z of the article 10A.

In the instants which precede the engagement of the head 21 with the article 10A situated in the station Q, the head is interested by a movement, as can be evinced from an analysis of FIGS. 7b, 7c constituted by two components of which one is parallel to the axis of the screw while the other is perpendicular to the said axis; this component is prevalent with respect to the remaining component.

In practice the direction of the movement of the head 21, which precedes the engagement with the article, is comprised between ±5 with respect to the perpendicular to the axis of the screw; in a preferred embodiment this movement is perpendicular to the axis of the screw.

As illustrated, in the station Q the screw disengages from the articles 10A which by force of inertia does not stop and intercepts the tine 21a downstream of the head 21 which has a development with respect to the axis G3 that is greater than the remaining tine 21b. The organ 19 engages the article 10A in the station Q independently of the velocity with which the article is drawn by the screw: there is a disengagement in station Q of the screw from the article which is intercepted by the head 21 moved perpendicularly to the axis of the screw at the station.

Figure 7G:
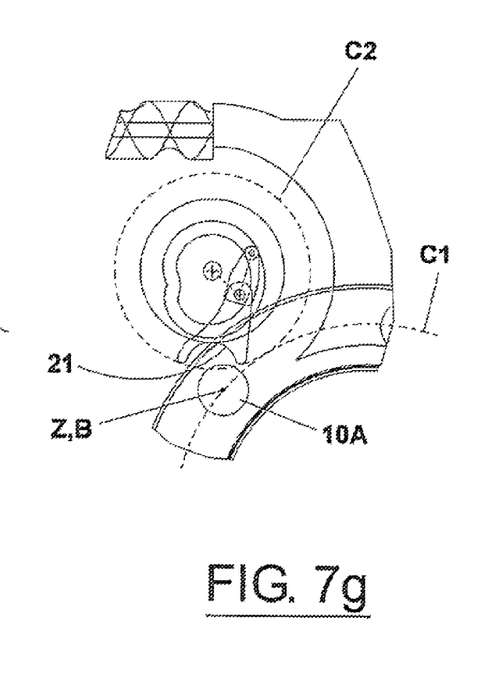

Downstream of the station Q the distance between the axes G2 and Y is maintained constant, at value R2, up to completion of the transfer of the article to the carousel 60 (see FIGS. 7d-7g); FIG. 7g illustrates the disengagement of the head 21 from the article 10A.

This transfer is made possible by the combined action of a plane 30 which supports the article 10A drawn by the head 21, and of a small wall 31, concentric to the axis G2 of the drum 11, which laterally guides the article.

The transfer is actuated as the following conditions obtain:
  the arc of circumference C2 described by the axis Z of the article 10A engaged by the head 21 is tangential to the circumference C1 described by the axes B of the seatings K of the carousel;

the peripheral velocity of the axis Z at least at the end of the arc of circumference C2 is equal to the peripheral velocity Vp of the axes B of the seatings K.

With methods that are known to the expert in the sector, the carousel 60 is moved such that a corresponding seating K receives the article 10A which follows the arc of circumference C2.

Figure 1:
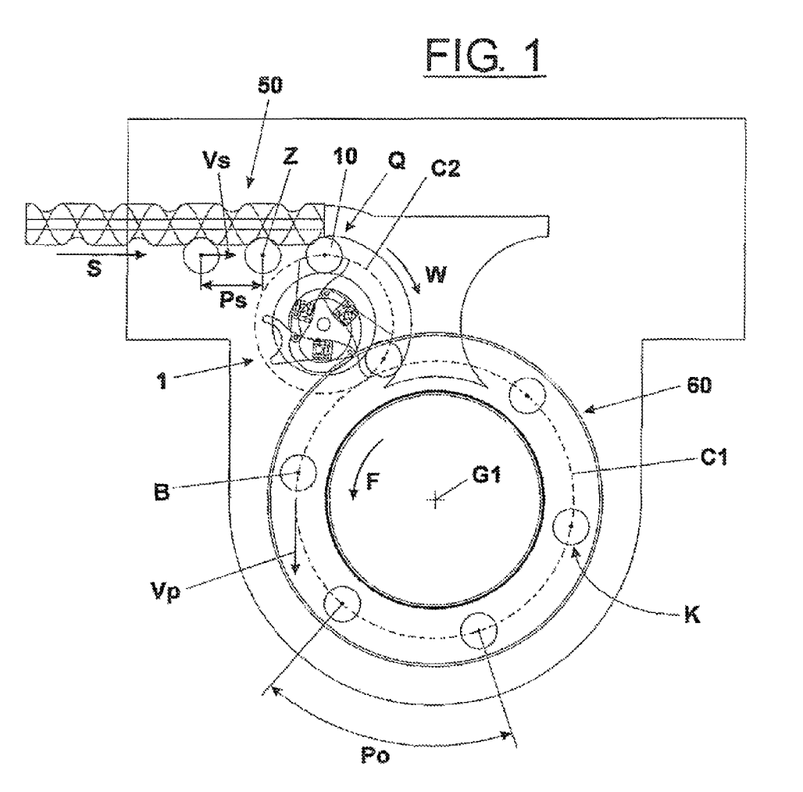
FIG. 1 is a plan view illustration of a schematic view of the system of the invention, located upstream of a carousel, also schematically illustrated.
Figure 2A:
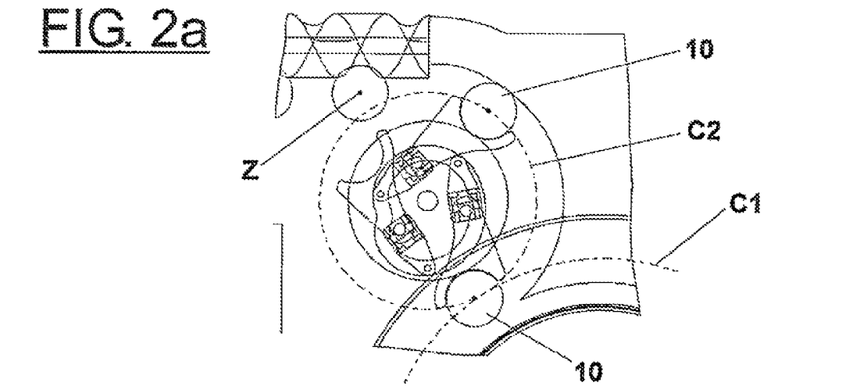
FIGS. 2a, 2b, 2c illustrate, in plan view, three operating configurations of a first embodiment of a device of the system.
Figure 2B:
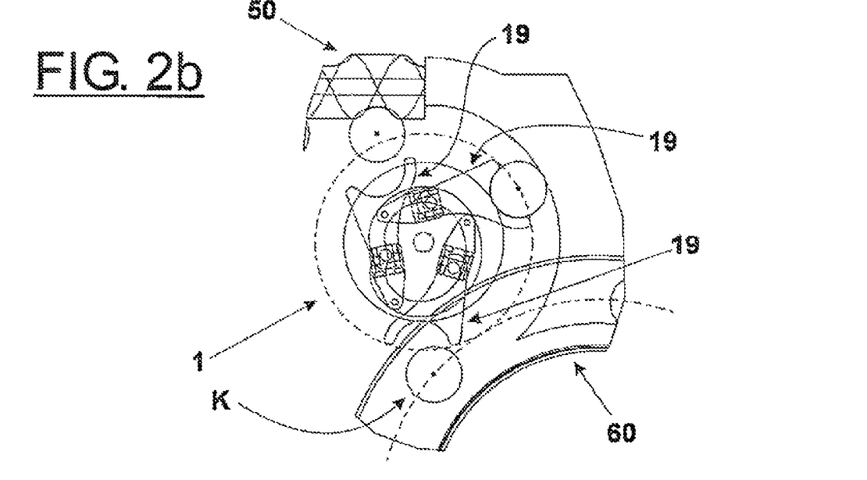
Figure 2C:
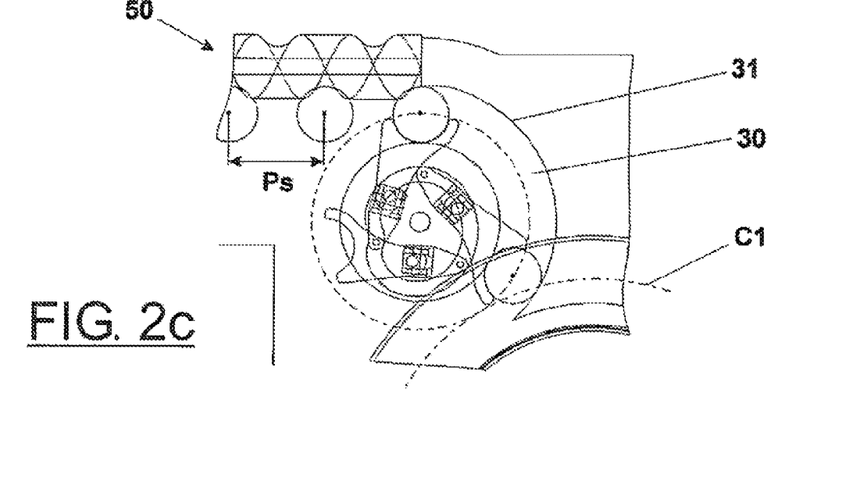
Figure 3A:
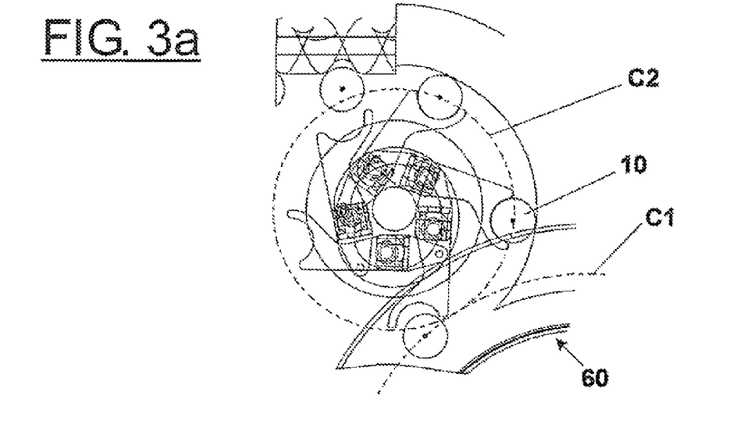
FIGS. 3a, 3b and 3c illustrate, in plan view, three operating configurations of a second embodiment of the device.
Figure 3B:
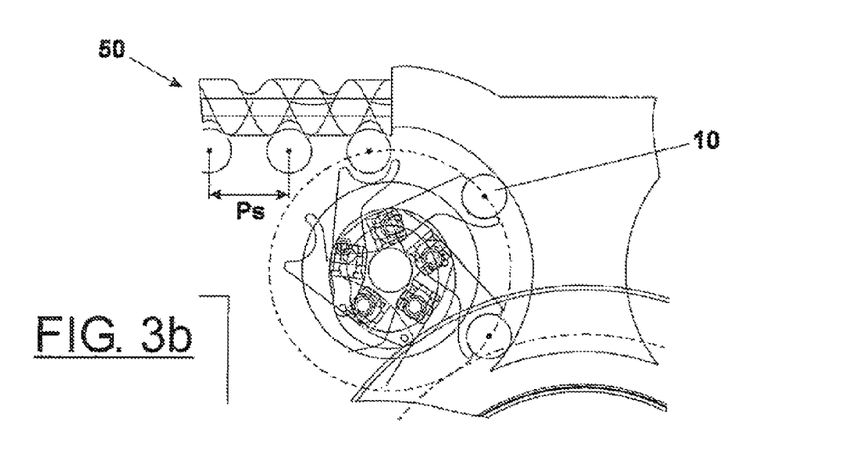
Figure 3C:
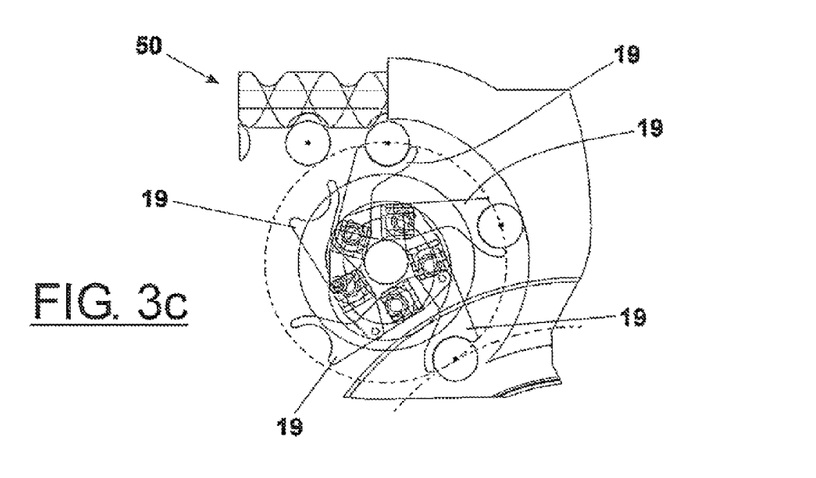
Figure 4:
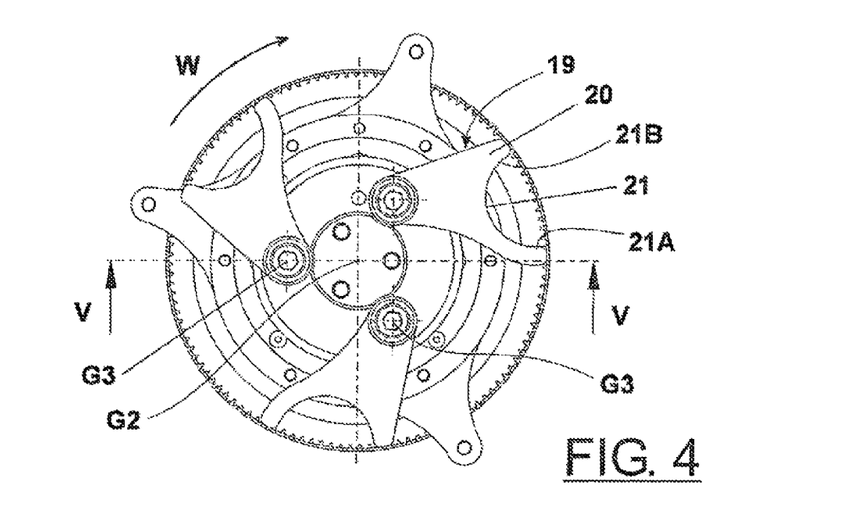
FIG. 4 is a view from above of the devices of the first embodiment.
Figure 5:
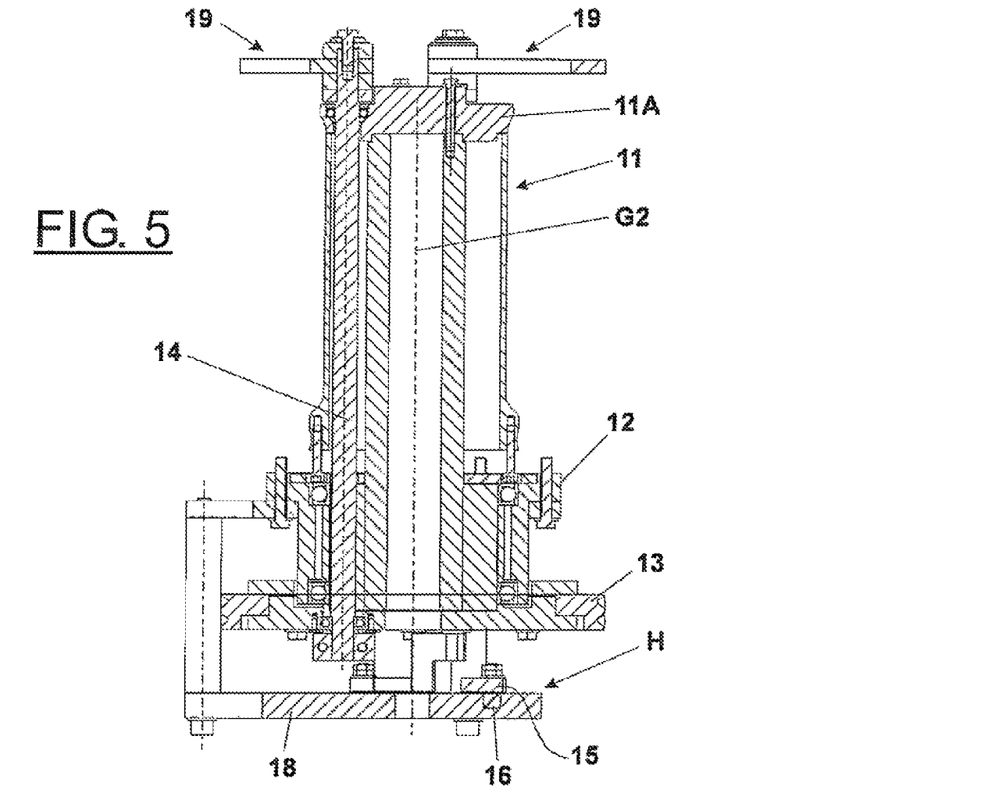
FIG. 5 is the view of section V-V of FIG. 4.

FIGS. 2a-2c illustrate a device provided with three pick-up organs 19, while in FIGS. 3a-3c the device comprises five pick-up organs 19.

These examples should not be considered limiting, as the device 10 interposed between the screw 50 and the carousel 60 can comprise from one to any number of pick-up organs 19.

The above is described by way of example, and any variants of a practical-applicational nature are intended to fall within the ambit of protection of the invention as it is claimed herein below.

The invention claimed is:

1. A system for supplying articles to a platform rotating about a vertical axis, the platform exhibiting seatings (K) conformed for receiving corresponding articles (10), vertical axes (B) of which are situated on a circumference (C1) which is coaxial to an axis of the platform (60), the vertical axes (B) being angularly equidistanced such as to define a predetermined operating step (Po), the system comprising:
a straight-developing line (50), supplied with articles (10), for intermittently transferring the articles (10) at an intermediate step (Ps) which is lower than the operating step (Po) to a terminal station (Q);
at least an article pick-up-and-transfer member (19), interposed between the line (50) and the platform (60), borne by a device (1) activated in phase relation with the movement of the line (50) and platform (60), destined, with an operating head (21) thereof, to engage the article situated at the terminal station (Q) in an inclined direction with respect to the straight development (S) of the line (50), and subsequently to transfer the article to a corresponding seating (K) of the platform (60) in order to define, for the vertical axis (Z) of the article, a trajectory which develops in an arc of circumference (C2) tangential to the circumference (C1) on which the axes (B) of the seatings (K) are arranged and with a peripheral velocity which is equal to a velocity (Vp) of the axes (B), and,
wherein the inclined direction is a sum of two components which are respectively parallel and perpendicular to the straight development of the line, the perpendicular component being of a greater entity than the parallel component.

2. The system of claim 1, wherein the inclined direction identifies, with respect to the straight development of the line, an angle comprised between ±5 degrees with respect to a perpendicular and the straight development.

3. The system of claim 1, wherein a transversal plane of the operating head (21) of the article pick-up-and-transfer member (19) affords a recess (22) that is concave with respect to a vertical axis (Y), the concavity of the recess being complementary to the transversal section of the articles.

4. The system of claim 3, wherein the vertical axis (Y) of the recess coincides, following an engagement thereof with an article (10), with the vertical axis (Z) of the article (10).

5. The system of claim 4, wherein the recess is delimited by two tines (21a, 21b) positioned upstream and downstream with respect to a rotation direction of the member (19), the downstream tine (21a) exhibiting a greater development than the upstream tine (21b) with respect to the oscillation axis (G3) of the member (19).

6. A system for supplying articles to a platform rotating about a vertical axis, the platform exhibiting seatings (K) conformed for receiving corresponding articles (10), vertical axes (B) of which are situated on a circumference (C1) which is coaxial to an axis of the platform (60), the vertical axes (B) being angularly equidistanced such as to define a predetermined operating step (Po), the system comprising:
a straight-developing line (50), supplied with articles (10), for intermittently transferring the articles (10) at an intermediate step (Ps) which is lower than the operating step (Po) to a terminal station (Q);
at least an article pick-up-and-transfer member (19), interposed between the line (50) and the platform (60), borne by a device (1) activated in phase relation with the movement of the line (50) and platform (60), destined, with an operating head (21) thereof, to engage the article situated at the terminal station (Q) in an inclined direction with respect to the straight development (S) of the line (50), and subsequently to transfer the article to a corresponding seating (K) of the platform (60) in order to define, for the vertical axis (Z) of the article, a trajectory which develops in an arc of circumference (C2) tangential to the circumference (C1) on which the axes (B) of the seatinqs (K) are arranged and with a peripheral velocity which is equal to a velocity (Vp) of the axes (B),
wherein the device comprises: a drum (11) set in constant rotation about a vertical axis (G2), to which drum (11) the article pickup-and-transfer member (19) is hinged, about a vertical axis (G3); first means acting on the article pick-up-and-transfer member (19) for subjecting the member (19) to oscillations with respect to the hinge axis (G3), defining, in combination with a rotation of the drum (11), engagement of the head (21) of the member (19) with the article situated at the terminal station (Q) and a subsequent transfer of the article, actuated in combination with support means (30) and guide means (31) of the article, to the corresponding seating (K) of the rotating platform (60).

7. The system of claim 6, wherein the first means comprise: a vertical spindle (14), defining the hinge axis (G3) of the member (19), an upper part of which is keyed to the member (19) and a lower part of which bears an arm (15) perpendicular to the spindle (14); a ring-closed cam race (17), an axis of which coincides with the axis (G2) of the drum (11), afforded on an upper part of a fixed disc (18), the cam race (17) being destined to receive a roller (16) borne idly by the free end of the arm (15).

8. The system of claim 6, wherein a transversal plane of the operating head (21) of the article pick-up-and-transfer member (19) affords a recess (22) that is concave with respect to a vertical axis (Y), the concavity of the recess being complementary to the transversal section of the articles.

9. The system of claim 8, wherein the vertical axis (Y) of the recess coincides, following an engagement thereof with an article (10), with the vertical axis (Z) of the article (10).

10. The system of claim 6, wherein the inclined direction is a sum of two components which are respectively parallel and perpendicular to the straight development of the line, the perpendicular component being of a greater entity than the parallel component.

11. The system of claim 6, wherein the inclined direction identifies, with respect to the straight development of the line, an angle comprised between ±5 degrees with respect to a perpendicular and the straight development.

12. A system for supplying articles to a platform rotating about a vertical axis, the platform exhibiting seatings (K) conformed for receiving corresponding articles (10), vertical axes (B) of which are situated on a circumference (C1) which is coaxial to an axis of the platform (60), the vertical axes (B) being angularly equidistanced such as to define a predetermined operating step (Po), the system comprising:

- a straight-developing line (50), supplied with articles (10), for intermittently transferring the articles (10) at an intermediate step (Ps) which is lower than the operating step (Po) to a terminal station (Q);
- at least an article pick-up-and-transfer member (19), interposed between the line (50) and the platform (60), borne by a device (1) activated in phase relation with the movement of the line (50) and platform (60), destined, with an operating head (21) thereof, to engage the article situated at the terminal station (Q) in an inclined direction with respect to the straight development (S) of the line (50), and subsequently to transfer the article to a corresponding seating (K) of the platform (60) in order to define, for the vertical axis (Z) of the article, a trajectory which develops in an arc of circumference (C2) tangential to the circumference (C1) on which the axes (B) of the seatings (K) are arranged and with a peripheral velocity which is equal to a velocity (Vp) of the axes (B),
- wherein a transversal plane of the operating head (21) of the article pick-up-and-transfer member (19) affords a recess (22) that is concave with respect to a vertical axis (Y), the concavity of the recess being complementary to the transversal section of the articles, and,
- wherein the recess is delimited by two tines (21a, 21b) positioned upstream and downstream with respect to a rotation direction of the member (19), the downstream tine (21a) exhibiting a greater development than the upstream tine (21b) with respect to the oscillation axis (G3) of the member (19).

13. The system of claim 12, wherein the inclined direction is a sum of two components which are respectively parallel and perpendicular to the straight development of the line, the perpendicular component being of a greater entity than the parallel component.

14. The system of claim 12, wherein the inclined direction identifies, with respect to the straight development of the line, an angle comprised between ±5 degrees with respect to a perpendicular and the straight development.

* * * * *